United States Patent [19]

Nakae et al.

[11] Patent Number: 5,510,404
[45] Date of Patent: Apr. 23, 1996

[54] STABILIZED RESIN COMPOSITION

[75] Inventors: Kiyohiko Nakae, Tokyo; Kozo Kotani, Osaka; Taiichi Sakaya, Osaka; Makoto Nakagahara, Osaka, all of Japan

[73] Assignee: Sumitomo Chemical Company, Limited, Osaka, Japan

[21] Appl. No.: 120,239

[22] Filed: Sep. 14, 1993

Related U.S. Application Data

[63] Continuation of Ser. No. 672,925, Mar. 21, 1991, abandoned.

[30] Foreign Application Priority Data

Mar. 22, 1990 [JP] Japan ................. 2-75222

[51] Int. Cl.$^6$ ............... C08K 5/34; C08K 3/32
[52] U.S. Cl. ............ 524/99; 524/100; 524/414; 524/415
[58] Field of Search ............ 524/89, 99, 100, 524/414, 415, 416; 546/184, 186, 188

[56] References Cited

U.S. PATENT DOCUMENTS

| | | | |
|---|---|---|---|
| 3,833,537 | 9/1974 | Jaquiss | 524/414 |
| 3,975,357 | 8/1976 | Murayama et al. | 524/99 |
| 4,210,577 | 7/1980 | Minagawa et al. | 524/99 |
| 5,025,051 | 6/1991 | Sato et al. | 524/99 |

FOREIGN PATENT DOCUMENTS

| | | |
|---|---|---|
| 3233952 | 3/1984 | European Pat. Off. |
| 0107615 | 5/1984 | European Pat. Off. |
| 0157738 | 10/1985 | European Pat. Off. |
| 0389640 | 10/1990 | European Pat. Off. |
| 48-10151 | 2/1973 | Japan |
| 59-27936 | 2/1984 | Japan |
| 64-16869 | 1/1989 | Japan |
| 226794 | 3/1990 | Japan |

*Primary Examiner*—Tae Yoon
*Attorney, Agent, or Firm*—Birch, Stewart, Kolasch & Birch

[57] ABSTRACT

A resin composition comprising a resin, a hindered piperidinyloxy compound of the formula (I):

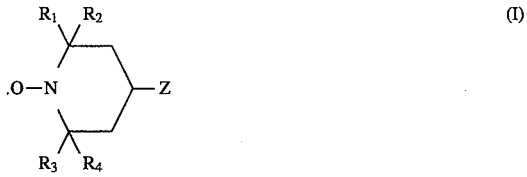

wherein $R_1$, $R_2$, $R_3$ and $R_4$ are independently a $C_1$-$C_4$ alkyl group and Z is a hydrogen atom or an organic group having at least one carbon atom, and a hypophosphite compound of the formula:

$$X_a(H_2PO_2)_b \quad (II)$$

wherein X is a metal ion, an ammonium ion or a phosphonium ion, a and b are positive numbers provided that they satisfy the equation: a×c=b in which c is a valency of X, wherein a weight ratio of the hypophosphite compound (II) to the hindered piperidinyloxy compound (II) is at least 0.001, which has good heat stability and weather resistance.

14 Claims, No Drawings

STABILIZED RESIN COMPOSITION

This application is a continuation of application Ser. No. 07/672,925 filed on Mar. 21, 1991, now abandoned.

BACKGROUND OF THE INVENTION

1. Field of the Invention

The present invention relates to a resin composition with good heat stability and weather resistance. More particularly, the present invention relates to a resin composition which has good heat stability and weather resistance and comprises a resin, a hindered piperidinyloxy compound and a hypophosphite compound.

2. Description of the Related Art

The amount of resins used outdoors is increasing year by year. Such use of these resins is required to have weather resistance according to the particular application used. To this end, various weathering stabilizers have been developed. Recently, hindered amine base weathering stabilizers, which are so-called hindered amine light stabilizers (HALS), are often used, since they can prevent a decrease of the mechanical properties or a change of color tones of the resin compositions when subjected to outdoor weathering, much better than the conventional weathering stabilizers (cf. Japanese Patent Kokai Publication No. 86645/1984).

Since weathering stabilizers cannot impart processing stability or heat stability to the resins, a heat stabilizer (e.g., hindered phenol base heat stabilizer, a sulfur base heat stabilizer and a phosphite ester base heat stabilizer) is generally added to the resin composition.

However, the heat stabilizing effect of the hindered phenol base heat stabilizer, which is added to the resin to impart processing stability and heat stability to the resin, may be deteriorated by the hindered amine base weathering stabilizer, or the resin composition may be discolored.

A hindered piperidinyloxy compound which can be derived from a hindered amine base weathering stabilizer, has substantially the same weathering stabilizing effect as the corresponding hindered amine type weathering stabilizer, and also has a heat stabilizing effect. However, its heat stabilizing effect on the resin composition is insufficient in comparison to the hindered phenol base heat stabilizer.

DESCRIPTION OF THE INVENTION

One object of the present invention is to provide a resin composition which comprises a hindered piperidinyloxy compound and a hypophosphite compound and has considerably improved heat stability and weathering stability.

Accordingly, the present invention provides a resin composition having good heat stability and weather resistance, which composition comprises a resin, a hindered piperidinyloxy compound of the formula (I):

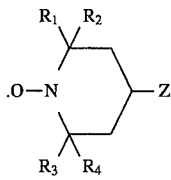
(I)

wherein $R_1$, $R_2$, $R_3$ and $R_4$ are independently a $C_1$-$C_4$ alkyl group and Z is a hydrogen atom or an organic group having at least one carbon atom, and a hypophosphite compound of the formula:

(II)

wherein X is a metal ion, an ammonium ion or a phosphonium ion, a and b are positive numbers provided that they satisfy the equation: $a \times c = b$ in which c is a valency of X, wherein a weight ratio of the hypophosphite compound (II) to the hindered piperidinyloxy compound (II) is at least 0.001.

DETAILED DESCRIPTION OF THE INVENTION

The hindered piperidinyloxy compound (I) used in the present invention may be prepared by, for example, oxidizing a corresponding hindered amine base weathering stabilizer (e.g., 2,2,6,6-tetramethylpiperidine, 2,2,6,6-tetraethylpiperidine, 2,2,6,6-tetrapropylpiperidine, 2,2,6,6-tetrabutylpiperidine, etc.) or its derivative having an organic substituent at the 4-position with m-chloroperbenzoic acid.

Specific examples of the hypophosphite compound (II) used in the present invention are metal hypophosphites (e.g. lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, etc.), ammonium hypophosphite compounds (e.g., ammonium hypophosphite, butylammonium hypophosphite, tetraethylammonium hypophosphite, N-cetylpyridinium hypophosphite, etc.), and phosphonium hypophosphite compounds (e.g., tetraphenylphosphonium hypophosphite).

Examples of the resin used in the present invention are olefin polymers such as polyethylene, polypropylene, poly-1-butene, poly-4-methyl-1-pentene, ethylenepropylene block copolymer, ethylene-propylene random copolymer, ethylene-1-butene copolymer, ethylene-1-hexene copolymer, ethylene-4-methyl-1-pentene copolymer, ethylene-1octene copolymer, propylene-1-butene copolymer, copolymers of an olefin and a polar vinyl compound such as ethylene-1vinyl acetate copolymer and ethylene-methyl methacrylate copolymer and ionomer resins; acrylic resins such as polymethyl methacrylate; polyester resins; polyamide resins; polycarbonate resins; phenol resins; polyvinyl chloride resins; polyurethane resins; and the like.

The amounts of components contained in the resin composition of the present invention are as follows:

The hindered piperidinyloxy compound is used in an amount of 0.01 to 10 parts by weight, preferably 0.05 to 1 part by weight per 100 parts by weight of the resin. When this amount is less than 0.01 part by weight, the heat stability and weather resistance are not effectively improved. When this amount exceeds 10 parts by weight, the heat stability and weather resistance are not further improved and such a larger amount is not economical. In addition, the hindered piperidinyloxy compound may unpreferably bleed out or deteriorate color tones of a produced made of the resin composition due to the color of the compound itself.

The added amount of the hypophosphite compound is usually at least 0.001 part by weight, preferably from 0.01 to 10 part by weight per one part of the hindered piperidinyloxy compound. When this amount is less than 0.001 part, the heat stability and weather resistance are not effectively improved.

The resin composition of the present invention may contain a UV light absorber, an antistatic agent, a lubricant, a filler, a flame retardant, a pigment and the like in such amount that the effects of the present invention are not deteriorated.

The compounding manner of the above components is not critical, and the components are compounded by an usual means such as a Banbury mixer, a mixing roll, an extruder and the like.

According to the present invention, combined use of the hypophosphite compound and the hindered piperidinyloxy compound in the resin composition achieves far better antioxidation effect than conventional antioxidant formulations such as a combination of the hindered phenol base thermal stabilizer and the hindered amine base weathering stabilizer; the hindered amine base weathering stabilizer alone; the hindered piperidinyloxy compound alone; or the hypophosphite compound alone. Such better effect may be due to a synergistic effect which can be achieved by the hindered piperidinyloxy compound and the hypophosphite compound or compounds derived therefrom and which stabilizes the resin composition.

The resin composition of the present invention is molded in the form of a film, a sheet, fibers and a molded article and used in various fields such as an agricultural film, an automobile parts material, etc. In particular, the film produced from the resin composition of the present invention comprising, as the resin, the polyolefin such as polyethylene or the ethylene-1-butene copolymer is very useful as a wrapping film and a covering material for agricultural green houses or tunnels. The resin composition of the present invention is useful as a material for outdoor use such as automobile parts, for example, a bumper or construction materials such as a roof of a garage.

EXAMPLES

The present invention will be illustrated by following Examples, which do not limit the scope of the present invention.

The test methods in Examples are as follows:
Heat stability test (1)

With a test sample of 1 mm in thickness (1 g), an induction period for oxygen absorption is measured by a measurement apparatus for polymer deterioration (manufactured by Shibayama Scientific Co., Ltd.)at a predetermined chamber internal temperature with an oxygen amount of 40 ml in a dark place. The induction period for oxygen absorption is expressed by a time period till the oxygen amount decreases by 0.9 ml or the internal oxygen volume indicates the minimum value when decomposed gases are generated, after the chamber temperature is stabilized. The longer induction period for oxygen absorption means better resistance to oxidative degradation, namely better heat stability.
Heat stability test (2)

The resin (35 g) and a selected additive or additives are kneaded with a LABOPLAST MILL (manufactured by Toyo Seiki Seisakusho Co., Ltd.) at 190° C. for 5 minutes at 10 rpm. Thereafter, the kneading conditions are changed to 190° C. and 60 rpm and change of torque during kneading is monitored. After the torque is once stabilized, it increases and then decreases according to deterioration of the oxidation resistance and gellation of the resin. A time period till the torque reaches maximum is recorded as a gellation time and used as a criterion for heat stability of the resin. The longer gellation time means better oxidation resistance, namely heat stability of the resin.
Weathering test A test sample of 3 cm both in width and length and 2 mm in thickness is aged by an EYE SUPER UV TESTER (trade mark) (a modified type of SUV-W 11, manufactured by Eye Graphics Co., Ltd) at a light amount of 100 mW/cm², an air temperature of 60° C., a relative humidity of 33 % with a distance from a light source of 24 cm. Then, a surface of the aged sample is observed with an optical microscope (200 times magnification) to inspect the presence of cracks, and an irradiation time by the UV TESTER till the generation of cracks is recorded. The longer irradiation time till the generation of cracks means the better weather resistance.
Preparation of the hindered piperidinyloxy
Compounds used in Examples
A hindered amine compound of the formula (I-a):

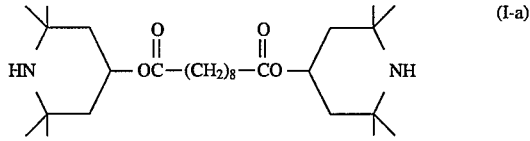

(Sanol (trademark) LS 770 manufactured by Sankyo Co., Ltd.) (5.89 g, 0.021 mole) was charged in a 300 ml wide mouth flask equipped with a magnetic stirring bar, and then methylene chloride (50 ml) was added to dissolved the compound (I-a).

To the solution, m-chloroperbenzoic acid (11.6 g, 0.047 mole) was added over 60 minutes with vigorous stirring under a nitrogen stream in a dark place. After addition of m-chloroperbenzoic acid, the mixture was further vigorously stirred for 5 hours in the dark place and precipitates were filtrated and washed with cold methylene chloride (20 ml).

The filtrate and the washing liquid were combined and washed with a 5 % aqueous solution of sodium carbonate (200 ml×3) and distilled water (100 ml).

A methylene chloride layer was dried over anhydrous magnesium sulfate, and the solvent was distilled off. The residue was recrystallized from a mixed solvent of chloroform and hexane (volume ratio of 5:95) to obtain 3.15 g of the hindered piperidinyloxy compound of the following formula:

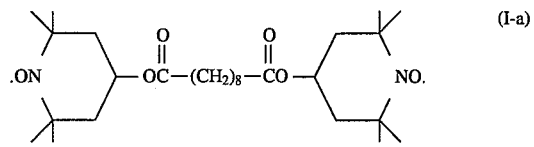

(hereinafter referred to as "HALS 770 NO.").

Example 1

A resin, a hypophosphite compound and a hindered piperidinyloxy compound as shown in Table 1 were compounded and kneaded with the LABOPLAST MILL at 160° C. for 5 at 60 rpm. Then, the mixture was press molded to form a sheet of 1 mm in thickness and subjected to the heat stability test (1) at the chamber temperature of 210° C. The results are shown in Table 1. The resin composition had good oxidation resistance, namely heat stability.

Comparative Examples 1–5

In the same manner as in Example 1 but not using the hypophosphite compound and the hindered piperidinyloxy compound in combination, the composition was prepared and subjected to the same test.

The used hindered phenol base heat stabilizer and hindered amine base weathering stabilizer are as follows:
Hindered phenol base heat stabilizer Sanol (trademark) LS 770 manufactured by Sankyo Co., Ltd. of the formula:

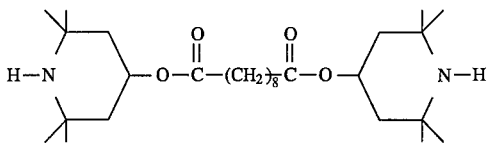

Hindered amine base weathering stabilizer
Sumilizer (trademark) BHT of the formula:

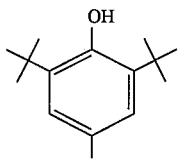

All the compositions had poor oxidation resistance, namely heat stability.

Examples 2–7

A resin, a hypophosphite compound and a hindered piperidinyloxy compound as shown in Table 2 were compounded and the gellation time was measured under the conditions of the heat stability test (2) with the resin amount being 35 g. The results are shown in Table 2 and indicate that the compositions had good oxidation resistance, namely heat stability.

Comparative Example 6

In the same manner as in Examples 2–7 but using no hypophosphite compound, the composition was prepared and the gellation time was measured.

The result indicated that the composition had poor oxidation resistance, namely heat stability.

Examples 8, 9 and 10

A resin, a hypophosphite compound and a hindered piperidinyloxy compound as shown in Table 3 were compounded and kneaded with the LABOPLAST MILL at 160° C. for 5 minutes at 60 rpm. Then, the mixture was press molded to form a sheet of 1 mm in thickness and subjected to the heat stability test (1) at the chamber temperature of 190° C. The results are shown in Table 3. The resin compositions had good oxidation resistance, namely heat stability.

Comparative Examples 6, 7 and 8

In the same manner as in Examples 8, 9 and 10 but using no hypophosphite compound, the composition was prepared and subjected to the heat stability test (1) at the chamber temperature of 190° C.

The results are in Table 3 and indicate that the compositions had poor oxidation resistance, namely heat stability.

Examples 11, 12 and 13

A resin, a hypophosphite compound and a hindered piperidinyloxy compound as shown in Table 4 were compounded and kneaded with the LABOPLAST MILL at 160° C. for 5 minutes at 60 rpm. Then, the mixture was press molded to form a sheet of 1 mm in thickness and subjected to the heat stability test (1) and the weathering test. The results are shown in Table 4. The resin compositions had good oxidation resistance, namely heat stability.

Comparative Examples 9, 10 and 11

In the same manner as in Examples 11, 12 and 13 but using no hypophosphite compound, the composition was prepared and subjected to the heat stability test (1) and the weathering test.

The results are in Table 4 and indicate that the compositions had poor oxidation resistance, namely heat stability.

TABLE 1

| | Composition (parts by weight) | | | | | Induction period for oxygen absorption (min.) |
|---|---|---|---|---|---|---|
| | Resin*[1] | Sodium hypophosphite | Hindered piperidinyloxy compound | Hindered phenol base heat stabilizer | Hindered amine base weathering stabilizer | |
| Example No. | | | | | | |
| 1 | 100 | 0.2 | 0.3 | — | — | 48 |
| Comp. 1 | 100 | — | — | — | — | 0 |
| Comp. 2 | 100 | 0.2 | — | — | — | 0 |
| Comp. 3 | 100 | — | 0.3 | — | — | 8 |
| Comp. 4 | 100 | — | — | — | 0.3 | 0 |
| Comp. 5 | 100 | — | — | 0.1 | 0.3 | 13 |

Note:
*[1] Low density polyethylene (Sumikasen (trademark) F 208-0 manufactured by Sumitomo Chemical Co., Ltd.)

TABLE 2

| | Composition (parts by weight) | | | Gellation time (min.) |
|---|---|---|---|---|
| | Resin*[1] | Hypophosphite compound (0.2 part) | Hindered*[2] piperidinyloxy compound | |
| Example No. | | | | |
| 2 | 100 | Sodium hypophosphite | 0.18 | 35 |
| 3 | 100 | Calcium hypophosphite | 0.18 | 38 |
| 4 | 100 | Potassium hypophosphite | 0.18 | 38 |
| 5 | 100 | Magnesium hypophosphite | 0.18 | 35 |
| 6 | 100 | Cetyltrimethylammonium hypophosphite | 0.18 | 55 |

TABLE 2-continued

| | | Composition (parts by weight) | | Gellation time (min.) |
|---|---|---|---|---|
| | Resin*[1] | Hypophosphite compound (0.2 part) | Hindered*[2] piperidinyloxy compound | |
| 7 | 100 | Tetrabutyl-ammonium hypophosphite | 0.18 | 50 |
| Comp. | | | | |
| 6 | 100 | — | 0.18 | 20 |

Note:
*[1]See Note 1) of Table 1.
*[2]2,2,6,6-Tetramethylpiperidinoxy (manufactured by Nakarai Tesk Co., Ltd.)

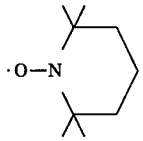

TABLE 3

| | Composition (parts by weight) | | | Induction period for oxygen absorption (min.) |
|---|---|---|---|---|
| | Resin (100 parts) | Sodium hypo-phosphite | Hindered*[4] piperidinyl-oxy compound | |
| Example No. | | | | |
| 8 | Homo-PP*[1] | 0.18 | 0.18 | 35 |
| 9 | Block PP*[2] | 0.18 | 0.18 | 26 |
| 10 | Modified PP*[3] | 0.18 | 0.18 | 56 |
| Comp. 6 | Homo-PP | — | 0.18 | 16 |
| Comp. 7 | Block PP | — | 0.18 | 10 |
| Comp. 8 | Modified PP | — | 0.18 | 5 |

Note:
*[1]Polypropylene (Sumitomo Noblen (trademark) HW 100 manufactured by Sumitomo Chemical Co., Ltd.).
*[2]An ethylene-propylene block copolymer (Sumitomo Noblen (trademark) AW 630 manufactured by Sumitomo Chemical Co., Ltd.).
*[3]Modified polypropylene (Bondfast (trademark) MPE 131 manufactured by Sumitomo Chemical Co., Ltd.).
*[4]See Note *2) of Table 2.

TABLE 4

| | Composition (parts by weight) | | | Heat stability test (1) | | Weathering test (hrs.) |
|---|---|---|---|---|---|---|
| | Resin (100 parts) | Sodium hypo-phosphite | Hindered*[4] piperidinyl-oxy compound | Chamber temp. (°C.) | Induction period for oxygen absorption (min) | |
| Example No. | | | | | | |
| 11 | EVA*[1] | 0.2 | 0.18 | 210 | 38 | 80 |
| 12 | EMMA*[2] | 0.2 | 0.18 | 210 | 55 | 80 |
| 13 | HDPE*[3] | 0.2 | 0.18 | 190 | 65 | 120 |
| Comp. 9 | EVA | — | 0.18 | 210 | 25 | 60 |
| Comp. 10 | EMMA | — | 0.18 | 210 | 35 | 60 |
| Comp. 11 | HDPE | — | 0.18 | 190 | 10 | 60 |

Note:
*[1]An ethylene-vinyl acetate copolymer (Evertate (trademark) D 2043 manufactured by Sumitomo Chemical Co., Ltd.).
*[2]An ethylene-methyl methacrylate copolymer (Acrift (trademark) WD 201 manufactured by Sumitomo Chemical Co., Ltd.).
*[3]High density polyethylene (Ace Polyethy S-5008 manufactured by Union Polymer Co., Ltd.).
*[4]See Note 2 of Table 2.

What is claimed is:

1. A resin composition comprising:
an olefin polymer or a copolymer of an olefin and a polar vinyl compound;
a hindered piperidinyloxy compound prepared by oxidizing a hindered amine base weathering stabilizer with m-chloroperbenzoic acid; and
a hypophosphite compound of the formula:

$$X_a(H_2PO_2)_b \qquad (II)$$

wherein X is a metal ion, an ammonium ion or a phosphonium ion, wherein a and b are positive numbers provided that they satisfy the equation: (a) (c)=b in which c is a valency of X, and wherein a weight ratio of the hypophosphite compound to the hindered piperdinyloxy compound is at least 0.001.

2. The resin composition according to claim 1, wherein said resin an olefin polymer 3. The resin composition according to claim 1, wherein an amount of said hindered piperidinyloxy compound is from 0.01 to 10 parts by weight per 100 parts by weight of said resin.

4. The resin composition according to claim 1, wherein said amount of said hindered piperidinyloxy compound is from 0.05 to 1 part weight per 100 parts by weight of said resin.

5. The resin composition according to claim 1, wherein said hypophosphite compound is selected from the group consisting of lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, tetraethylammonium hypophosphite, N-cetylpyridinium hypophosphite and tetraphenylphosphonium hypophosphite.

6. The resin composition according to claim 1, wherein said olefin polymer or a copolymer of an olefin and a polar vinyl compound is selected from the group consisting of polyethylene, polypropylene, poly-1-butene, poly-4-methyl-1-pentene, ethylene-propylene block copolymer, ethylene-propylene random copolymer, ethylene-1-butene copolymer, ethylene-1-hexene copolymer, ethylene-4-methyl-1-pentene copolymer, ethylene-1-octene copolymer, propylene-1-butene copolymer, ethylene-1-vinyl acetate copolymer and ethylene-methyl methacrylate copolymer.

7. The resin composition according to claim 1, wherein the hindered piperidinyloxy compound is prepared by oxidizing a corresponding hindered amine base weathering stabilizer with m-chloroperbenzoic acid and said corresponding hindered amine base weathering stabilizer is selected from the group consisting of 2,2,6,6-tetramethylpiperidine, 2,2,6,6-tetraethylpiperidine, 2,2,6,6-tetrapropylpiperidine, and 2,2,6,6tetrabutylpiperidine.

8. The resin composition according to claim 1, wherein the hindered piperidinyloxy compound is

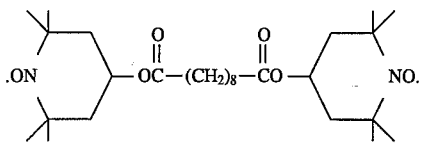

9. A resin composition comprising:

an olefin polymer or a copolymer of an olefin and a polar viny compound;

a hindered piperidinyloxy compound prepared by oxidizing a hindered amine base weathering stabilizer; and a hypophosphite compound of the formula:

$$X_a(H_2PO_2)_b \quad (II)$$

wherein X is a metal ion, an ammonium ion or a phosphonium ion, wherein a and b are positive numbers provided that they satisfy the equation: (a) (c)=b in which c is a valency of X, and wherein a weight ratio of the hypophosphite compound to the hindered piperidinyloxy compound is at least 0.001.

10. The resin composition according to claim 9, wherein the hindered piperidinyloxy compound is prepared by oxidizing a corresponding hindered amine base weathering stabilizer and said corresponding hindered amine base weathering stabilizer is selected from the group consisting of 2,2,6,6-tetramethylpiperidine, 2,2,6,6-tetraethylpiperidine, 2,2,6,6-tetrapropylpiperidine and 2,2,6,6-tetrabutylpiperidine.

11. The resin composition according to claim 9, wherein the hindered piperidinyloxy compound is prepared by oxidizing a corresponding hindered amine base weathering stabilizer with m-chloroperbenzoic acid and said corresponding hindered amine base weathering stabilizer is selected from the group consisting of 2,2,6,6-tetramethylpiperidine, 2,2,6,6-tetraethylpiperidine, 2,2,6,6-tetrapropylpiperidine, and 2,2,6,6-tetrabutylpiperidine.

12. The resin composition according to claim 9, wherein an amount of said hindered piperidinyloxy compound is from 0.01 to 10 parts by weight per 100 parts by weight of said resin.

13. The resin composition according to claim 9, wherein said hypophosphite compound is selected from the group consisting of lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, tetraethylammonium hypophosphite, N-cetylpyridinium hypophosphite and tetraphenylphosphonium hypophosphite.

14. The resin composition according to claim 9, wherein said olefin polymer or a copolymer of an olefin and a polar vinyl compound is selected from the group consisting of polyethylene, polypropylene, poly-1-butene, poly-4-methyl-1-pentene, ethylene-propylene block copolymer, ethylene-propylene random copolymer, ethylene-1-butene copolymer, ethylene-1-hexene copolymer, ethylene-4-methyl-1-pentene copolymer, ethylene-1-octene copolymer, propylene-1-butene copolymer, ethylene-1-vinyl acetate copolymer and ethylene-methyl methacrylate copolymer.

* * * * *